United States Patent
Miyake et al.

[11] Patent Number: 6,124,381
[45] Date of Patent: Sep. 26, 2000

[54] EXPOXY/ACID ANHYDRIDE COMPOSITION

[75] Inventors: Satoru Miyake; Kenichi Osawa; Toshinari Koda; Motohiko Hidaka, all of Funabashi, Japan

[73] Assignee: Nissan Chemical Industries, Ltd., Tokyo, Japan

[21] Appl. No.: 08/973,982

[22] PCT Filed: Jun. 13, 1996

[86] PCT No.: PCT/JP96/01612

§ 371 Date: Dec. 15, 1997

§ 102(e) Date: Dec. 15, 1997

[87] PCT Pub. No.: WO97/00277

PCT Pub. Date: Jan. 3, 1997

[30] Foreign Application Priority Data

Jun. 15, 1995 [JP] Japan .................................. 7-149019

[51] Int. Cl.⁷ .................................................. C08K 5/18
[52] U.S. Cl. ............................ 523/461; 524/100; 528/94
[58] Field of Search ................................. 523/461, 455; 524/100; 528/94

[56] References Cited

U.S. PATENT DOCUMENTS

| | | |
|---|---|---|
| 2,228,161 | 1/1941 | Zerweck . |
| 3,726,679 | 4/1973 | Abolafia et al. . |
| 5,340,946 | 8/1994 | Friedrich et al. ................. 174/256 |

FOREIGN PATENT DOCUMENTS

| | | |
|---|---|---|
| 889 593 | 7/1949 | Germany . |
| 56-72019 | 6/1981 | Japan . |
| 57-137 318 | 8/1982 | Japan . |
| 58-225121 | 12/1983 | Japan . |
| 84028970 | 7/1984 | Japan . |
| 60-202 117 | 10/1985 | Japan . |
| 61-233 013 | 10/1986 | Japan . |
| 3-215 564 | 9/1991 | Japan . |
| 6-166 618 | 6/1994 | Japan . |
| 6-280 370 | 10/1994 | Japan . |
| 6-292 791 | 10/1994 | Japan . |
| 1-191 790 | 5/1970 | United Kingdom . |

OTHER PUBLICATIONS

Chemical Society (J. Am. Chem. Soc.), vol. 73, p. 2984, 1951.

Chemishe–Berichte (Chem. Ber.), vol. 18, p. 2755, 1885.

Primary Examiner—Robert Dawson
Assistant Examiner—D. Aylward
Attorney, Agent, or Firm—Oliff & Berridge, PLC

[57] ABSTRACT

An epoxy/acid anhydride composition characterized by containing, as a curing accelerator, a substituted triazine of the formula [I]

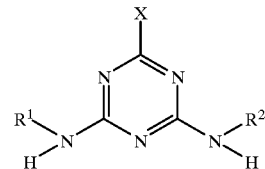

(wherein X is an amino group, $C_{1-18}$ monoalkylamino group, di $C_{1-18}$ alkylamino group, morpholino group, piperidino group, methyl group or phenyl group; $R^1$ and $R^2$ independently each represent $C_{1-12}$ alkyl group, $C_{1-12}$ hydroxyalkyl group, $C_{4-8}$ cycloalkyl group, $C_{5-9}$ cycloalkylmethyl group or $C_{5-9}$ methylcycloalkyl group) in an epoxy/acid anhydride composition in which an epoxy compound and an acid anhydride-curing agent are contained, and an epoxy/acid anhydride resin composition prepared by thermosetting the epoxy/acid anhydride composition.

6 Claims, No Drawings

EXPOXY/ACID ANHYDRIDE COMPOSITION

TECHNICAL FIELD

The present invention relates to an epoxy-based resin composition, particularly, an epoxy/acid anhydride composition which has quick-curability and storage stability for a long term, and an epoxy/acid anhydride resin composition prepared by thermosetting the epoxy/acid anhydride composition. The epoxy/acid anhydride composition of the present invention is useful for an improvement of workability in curing and physical properties for casting materials, laminating materials, molding compound for encapsulation, resin for embedding, adhesives, and coatings, etc.

BACKGROUND ART

An epoxy resin has been widely employed as adhesives, coatings, casting materials, molding compound for encapsulation, resin for embedding, and laminating materials because of an excellent adhesive property with metallic materials and glass, high mechanical strength, and excellent workability in curing, etc.

An epoxy resin is designed as being cured by mixing with an amine-curing agent, a mercaptan-curing agent, a phenol resin-curing agent, and an acid anhydride-curing agent in response to the uses of the epoxy resin, and those are occasionally employed together with a tertiary amine-, quaternary ammonium-, tertiary phosphine-, imidazole-, and azabicyclo compound-curing accelerator as a catalyst for the purpose of the addition of curability at low temperature and curability in a short time of period, etc.

In recent years, requirements for an improvement in characteristics have become more advanced in a variety of utilization fields for a cured article prepared from an epoxy resin. In the system in which an amine-curing agent is contained, there also increase fields in which characteristics cannot be satisfied by conventional products because of a problem such as storage stability for a long term caused by a great change of viscosity after the amine-curing agents are contained. Further, in a system which employs an acid anhydride- or phenol resin-curing agent, etc, there is a similar problem in curing accelerators mainly employed until now, which include tertiary amine-, quaternary ammonium-, tertiary phosphine-, quaternary phosphonium-, imidazole-, and azabicyclo compound-ones. For solving the problem, it has been proposed a modified epoxy adduct, a modified aliphatic amine, a modified polyamide amine, a mannich-modified amine, a thiourea-modified amine, a Schiff-modified amine (obtained by ketiminization), a Michael addition-modified amine, and a quaternary salt of imidazoles, etc.

There is an attempt that an N-substituted melamine is employed as an amine-curing agent for improving a storage stability after mixing and workability, etc. As such epoxy resin compositions, Japanese Patent Application Laid-open No. Sho 56-72019 discloses an epoxy resin composition in which an N-substituted melamine is contained. British Patent No. 1192790 discloses an epoxy resin composition in which an N-substituted melamine having at least two primary amino groups or guanamine, etc. is contained as an amine-curing agent.

There is an attempt that an N-substituted melamine is employed as a curing accelerator in an epoxy compound/phenol resin curing system for improving a stability such as a pot life after mixing and workability. As such epoxy resin compositions, Japanese Patent Application Laid-open No. Sho 60-202117 discloses an epoxy resin composition in which an N-substituted melamine and a novolak-type phenol resin are contained.

In the case of preparing an epoxy compound/acid anhydride-cured resin, if a tertiary amine-, a quaternary ammonium-, a quaternary phosphonium-, imidazole-, and azabicyclo compound-curing accelerators, etc. are not contained, reactivity of an epoxide with an acid anhydride is poor, productivity exceedingly lowers in a cured resin, and it becomes substantially difficult to prepare the cured resin. However, if such the curing accelerator is employed together as a catalyst, reaction usually proceeds even at a relatively low temperature, viscosity increases with a lapse of time and, further, gelling is caused, resulting in that a composition becomes incapable of employing.

Further, as a method for prolonging a pot life, although there is a means in which a very small amount of the above-mentioned curing accelerator or a curing accelerator having a low activity is employed, it is apt to cause defects such as bubbles and cracks, etc, particularly, in a curing reaction at high temperatures.

In the above-mentioned British Patent No. 1192790, it is disclosed an epoxy compound/acid anhydride-curing resin system and an epoxy compound/amine-curing resin system, and it is disclosed an epoxy resin composition in which an N-substituted melamine having at least two primary amino groups or guanamine, etc. is mixed as an amine-curing agent together with a benzoyl urea- and a sulfonyl urea-curing accelerator. In the curing resin systems, it is exemplified that the N-substituted melamine having at least two primary amino groups or guanamine, etc. shows an excellent property, and in Examples for the acid anhydride-curing system, it is disclosed a combination with the benzoyl urea- or sulfonyl urea-curing accelerator.

The present invention uses an acid anhydride-curing agent in an epoxy compound and contain a substituted triazine compound having a specified structure in a limited amount as a curing accelerator, whereby aiming to provide an epoxy/acid anhydride composition which is excellent in a pot life after the curing agent is contained, storage stability, and workability, and an epoxy/acid anhydride resin composition prepared by thermosetting the epoxy/acid anhydride composition, and in which defects such as bubbles and cracks are not caused in a cured resin at all.

DISCLOSURE OF THE INVENTION

The present invention relates to an epoxy/acid anhydride composition characterized by containing, as a curing accelerator, a substituted triazine of the formula [I]

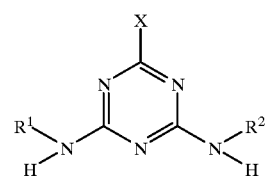

(wherein X is an amino group, $C_{1-18}$ monoalkylamino group, di $C_{1-18}$ alkylamino group, morpholino group, piperidino group, methyl group or phenyl group; $R^1$ and $R^2$ independently each represent $C_{1-12}$ alkyl group, $C_{1-12}$ hydroxyalkyl group, $C_{4-8}$ cycloalkyl group, $C_{5-9}$ cycloalkylmethyl group or $C_{5-9}$ methylcycloalkyl group) in an epoxy/acid anhydride composition in which an epoxy compound and an acid anhydride-curing agent are contained, and an epoxy/acid anhydride resin composition prepared by thermosetting the epoxy/acid anhydride composition.

Hereinafter, the present invention will be described in detail.

As the epoxy compound to be employed in the present invention, it is preferable to contain at least two epoxy groups in the molecule from a viewpoint of heat resistance and mechanical strength in a cured resin. Of the epoxy compound having two epoxy groups, a bisphenol A-epoxy resin prepared by a reaction of bisphenol A with epichlorohydrine, a bisphenol F-epoxy resin prepared by a reaction of bisphenol F with epichlorohydrine, and a bisphenol S-epoxy resin prepared by a reaction of bisphenol S with epichlorohydrine, etc. are exemplified, and they are preferable to have molecular weight of 300 to 5000. As the epoxy compound having at least three epoxy groups, a novolak-epoxy resin prepared by a reaction of a phenol novolak resin or a cresol novolak resin with epichlorohydrin, triglycidylisocyanurate, tris(α-methylglycidyl) isocyanurate, tris(β-methylglycidyl)-isocyanurate, tris (hydroxyphenyl)methanetriglycidyl ether, 1,3,5-tri (glycidyloxy)benzene, triglycidylester of 1,3,5-trimesic acid, tetraglycidylxylenediamine, tetraglycidylamino-diphenylmethane, and tetrakis(4-hydroxyphenyl) ethane tetraglycidylether, etc. are exemplified. Further, in order to reduce viscosity in a composition and to give flexibility to a cured resin, glycol diglycidylethers such as a neopentylglycol diglycidylether, a hexamethyleneglycol diglycidylether, etc., polyoldiglycidylethers such as a polyethyleneglycol diglycidylether, a polypropyleneglycol diglycidylether as an aliphatic-epoxy compound having two epoxy groups can be used together, and polyolpolyglycidyl-ethers such as glycerine polyglycidylether, pentaerythritol polyglycidylether, trimethylolpropane polyglycidylether, etc. as an aliphatic-epoxy resin having three or more epoxy groups can be used together.

Since an epoxy compound having one epoxy group such as phenylglycidylether and butylglycidylether lowers a crosslinking density, the amount to be used must be limited so that the number of epoxy groups in the epoxy compounds becomes at least 2 on an average.

As the acid anhydride to be employed in the present invention, it is preferable to use an acid anhydride having one acid anhydride group in the molecule such as phthalic anhydride, tetrahydrophthalic anhydride, hexahydrophthalic anhydride, methyltetrahydrophthalic anhydride, methylhexahydrophthalic anhydride, nadic anhydride, methylnadic anhydride, maleic anhydride, succinic anhydride, octylsuccinic anhydride, and dodecenylsuccinic anhydride. Further, an acid anhydride having two acid anhydride groups in the molecule such as pyromellitic anhydride, cyclobutane tetracarboxylic anhydride, naphthalene tetracarboxylic anhydride, and tetralin-dicarboxylic anhydride, and an acid anhydride having one acid anhydride group and one carboxylic group in the molecule such as trimellitic anhydride have usually a high melting point, and those are poor in solubility into epoxy compounds and solvents, etc., whereby, resins are apt to become unequal in a curing reaction. Accordingly, the use quantity is limited within a quantity capable of uniformly copolymerizing in a system, and it is preferably not more than 10% by weight based on the total weight of the acid anhydrides.

Mixing ratio of the above-mentioned epoxy compounds to the acid anhydrides is 0.7 to 1.2 equivalent, preferably 0.8 to 1.1 equivalent, and more preferably 0.9 to 1.0 equivalent of acid anhydride group based on 1 equivalent of epoxy group.

As the substituted triazine employed which is a curing accelerator for an epoxy resin to be employed in the present invention, compounds having at least two secondary amino groups as shown in the formula [I] and also containing any one of a various kinds of functional groups described below are preferable.

That is, X is amino group, monoalkylamino group of alkyl group having 1 to 18 carbon atoms, dialkylamino group of alkyl group having 1 to 18 carbon atoms, morpholino group, piperidino group, methyl group or phenyl group. Of the groups, amino group, monoalkylamino group having 1 to 12 carbon atoms, dialkylamino group having 1 to 12 carbon atoms or piperidino group are more preferable.

In $R^1$ and $R^2$ as the secondary amino group, in a case of alkyl group having 1 to 12 carbon atoms, said group may be straight-chain or branched and alkyl group hving 1 to 9 is more preferable; in a case of hydroxyalkyl group having 1 to 12, said group may be straight-chain or branched and the position of the hydroxy group is not particularly limited and alkyl group having 1 to 9 is more preferable; in a case of cycloalkyl group having 4 to 8 carbon atoms, cyclopentyl group or cyclohexyl group is more preferable; in the case of cycloalkylmethyl group having 5 to 9 carbon atoms, methylcyclobutyl group, methylcyclopentyl group, methylcyclohexyl group, methylcycloheptyl group or methylcyclooctyl group are exemplified, and cyclopentylmethyl group or cyclohexylmethyl group are more preferable; in the case of methylcycloalkyl group having 5 to 9 carbon atoms, methylcyclobutyl group, methyl cyclopentyl group, methylcyclohexyl group, methylcyclo-heptyl group or methylcyclooctyl group are exemplified, and cyclopentylmethyl group or cyclohexylmethyl group is more preferable. These substituted triazines may be used solely or in combination.

The substituted triazine shown by the formula [I] to be employed in the present invention can be readily prepared by a publicly known conventional method. For example, it includes a method described in Journal of American Chemical Society (J. Am. Chem. Soc.), vol. 73, page 2984, 1951, in which a 2-chloro-1,3,5-triazine derivative is allowed to react with an alkyl amine hydrochloride, a method described in Chemishe-Berichte (Chem Ber.), vol. 18, page 2755, 1885, in which a 2,4,6-trimethylthio-1,3,5-triazine derivative is allowed to react with an alkyl amine, a method described in U.S. Pat. No. 2,228,161, 1941, in which 2,4, 6-triamino-1,3,5-triazine is allowed to react with an alkyl amine hydrochloride, and a method described in German Patent No. 889,593, 1953, in which 2-piperidino-4,6-diamino-1,3,5-triazine is obtained by allowing to react cyanopiperidine with cyanoguanidine, and a method described in Japanese Patent Application Laid-open No. Hei 3-215564, in which cyanuric chloride is allowed to react with corresponding alkyl amines.

Further, following methods are raised, i.e., a method described in Japanese Patent Application No. Hei 6-166618, in which a 1,3,5-triazine derivative is allowed to react with an alcohol in the presence of a catalyst of group VII or group VIII in periodic table, a method described in Japanese Patent Application No. Hei 6-280370, in which a 1,3,5-triazine derivative is allowed to react with an alcohol in the presence of a catalyst of group VII or group VIII in the periodic table and a hydrogen-containing gas, and a method described in Japanese Patent Application No. Hei 6-292791, in which a 1,3,5-triazine derivative is allowed to react with an olefine in the presence of a catalyst of group VII or group VIII in the periodic table and a carbon monoxide/hydrogen mixed gas, etc. These Japanese patent applications were filed in Japan by the present applicant. Although the substituted triazine may be prepared by these methods or any method, in the case that it is employed in fields of electronic materials, it is preferable to obtain substituted triazines by using a method for reacting melamine having less hydrolyzable chlorine which is retained in the substituted triazine, with alcohols under the presence of a specified catalyst, a method for reacting a melamine with aldehydes under the presence of a specified catalyst in a hydrogen atmosphere, and a method for reacting of a melamine with olefines under the presence of a specified catalyst in a hydrogen/carbon monoxide atmosphere.

Such the substituted triazines specifically include 2-amino-4-(mono-2-hydroxyethyl)amino-6-monoethylamino-1,3,5-triazine, 2-amino-4,6-bis(monoethylamino)-1,3,5-triazine, 2-amino-4,6-bis(monobutylamino)-1,3,5-triazine, 2-amino-4,6-bis(monocyclohexylamino)-1,3,5-triazine, 2-amino-4,6-bis(monocyclohexylmethylamino)-1,3,5-triazine, 2-amino-4,6-bis(methylcyclohexylamino)-1,3,5-triazine, 2-amino-4,6-bis(mono-2-ethylhexylamino)-1,3,5-triazine, 2-amino-4,6-bis(monododecylamino)-1,3,5-triazine, 2,4-bis(mono-2-hydroxyethylamino)-6-methyl-1,3,5-triazine, 2,4-bis(monoethylamino)-6-methyl-1,3,5-triazine, 2,4-bis(monobutylamino)-6-methyl-1,3,5-triazine, 2,4-bis(monocyclohexylamino)-6-methyl-1,3,5-triazine, 2,4-bis(mono-2-ethylhexylamino)-6-methyl-1,3,5-triazine, 2,4-bis(monododecylamino)-6-methyl-1,3,5-triazine, 2,4-bis(mono-2-hydroxyethylamino)-6-phenyl-1,3,5-triazine, 2,4-bis(monoethylamino)-6-phenyl-1,3,5-triazine, 2,4-bis(monobutylamino)-6-phenyl-1,3,5-triazine, 2,4-bis(monocyclohexylamino)-6-phenyl-1,3,5-triazine, 2,4-bis(mono-2-ethylhexylamino)-6-phenyl-1,3,5-triazine, 2,4-bis(monododecylamino)-6-phenyl-1,3,5-triazine, 2,4,6-tris(monoethylamino)-1,3,5-triazine, 2,4,6-tris(mono-2-hydroxyethylamino)-1,3,5-triazine, 2,4,6-tris(monoisopropylamino)-1,3,5-triazine, 2,4,6-tris(butylamino)-1,3,5-triazine, 2,4,6-tris(monocyclohexylamino)-1,3,5-triazine, 2,4,6-tris(mono-2-ethylhexylamino)-1,3,5-triazine, 2,4,6-tris(monododecylamino)-1,3,5-triazine, 2,4-bis(monoethylamino)-6-diethylamino-1,3,5-triazine, 2,4-bis(mono-2-hydroxyethylamino)-6-di(mono-2-hydroxyethyl)amino-1,3,5-triazine, 2,4-bis(butylamino)-6-dibutylamino-1,3,5-triazine, 2,4-bis(monocyclohexylamino)-6-dibutylamino-1,3,5-triazine, 2,4-bis(mono-2-ethylhexylamino)-6-dibutylamino-1,3,5-triazine, 2,4-bis(monododecylamino)-6-di(mono-2-ethlyhexyl)amino-1,3,5-triazine, 2,4-bis(2-hydroxyethylamino)-6-piperidino-1,3,5-triazine, 2,4-bis(monoethylamino)-6-piperidino-,1,3,5-triazine, 2,4-bis(monobutylamino)-6-piperidino-1,3,5-triazine, 2,4-bis(monocyclohexylamino)-6-piperidino-1,3,5-triazine, 2,4-bis(mono-2-ethylhexylamino)-6-piperidino-1,3,5-triazine, 2,4-bis(monododecylamino)-6-piperidino-1,3,5-triazine, 2,4-bis(mono-2-hydroxyethylamino)-6-morpholino-1,3,5-triazine, 2,4-bis(monoethylamino)-6-morpholino-1,3,5-triazine, 2,4-bis(monobutylamino)-6-morpholino-1,3,5-triazine, 2,4-bis(monocyclohexylamino)-6-morpholino-1,3,5-triazine, 2,4-bis(mono-2-ethylhexylamino)-6-morpholino-1,3,5-triazine, and 2,4-bis(monododecylamino)-6-morpholino-1,3,5-triazine, etc.

The substituted triazine shown in the formula [I] is preferably mixed in a quantity of 0.1 to 5 parts by weight, and more preferably 0.2 to 3 parts by weight based on 100 parts by weight of the epoxy compounds.

Curing reaction in thus-mixed epoxy/acid anhydride composition of the present invention may be carried out in a condition of either the absence of solvents such as casting materials or the presence of appropriate organic solvents such as coatings, varnishes, and varnishes for impregnation in laminating. In the case that the organic solvents are employed, ketone-solvents such as methylisobutyl ketone, ester-solvents such as butylacetate, ether-solvents such as dioxane, alcohol-solvents such as butanol, Cellosolve-solvents such as butyl Cellosolve, Carbitol-solvents such as butylcarbitol, aromatic hydrocarbon-solvents such as toluene and xylene, amide-solvents such as dimethyl formamide and dimethyl acetamide, sulfoxide-solvents such as dimethyl-sulfoxide, and pyrrolidone-solvents such as N-methylpyrrolidone, etc. are exemplified.

If the curing reaction is not remarkably hindered, any solvents may be employed.

Temperature in the curing reaction is preferably 80 to 250° C., and more preferably 100 to 220° C. In the case that a solvent having a low boiling point is employed, an autoclave and the like is used and reaction can be carried out at 80 to 250° C., and preferably 100 to 220° C. under pressure of 2 to 100 kg/cm$^2$. Also, the temperature may be maintained at a fixed temperature until the completion of the reaction, and may be carried out while elevating the temperature in a fixed speed with the progress of the reaction. Further, it may be intermittently elevated in multiple stages, for example, such as 100° C.×1 hour → 150° C.×3 hour → 200° C.×5 hour . . . , that is, it is a method for curing at a high temperature after a change to a B stage or oligomer at a relatively low temperature.

Still further, a small quantity of optional components can be further mixed so far as the aim of the present invention is attained, which include a variety of additives such as, for example, a silicone oil-, amide- and ester-defoaming agent, a hindered phenol- and hindered amine-stabilizer, metal soap such as a stearate, a silicone resin- and fluorine resin-release agent in response to purposes, whereby obtaining a further preferred epoxy resin composition having heat resistance.

(Effects)

As an epoxy resin composition composed of an epoxy compound and a substituted triazine, Japanese Patent Application Laid-open No. Sho 56-72019 discloses an epoxy resin composition in which an N-substituted melamine having a triazine skeltone is contained. This publication shows an example that a substituted melamine is applied as an amine-curing agent. In a usual amine-curing agent, it is publicly known that although it is depending upon a mixing ratio, not only an addition reaction of an epoxy group with an amino hydrogen in the primary amino group or a secondary amino group is caused, but also an addition reaction of an epoxy group with OH group and an anion polymerization reaction between epoxy groups is caused. Since a reaction of an epoxy compound with an N-substituted melamine is also identical to the reactions, a bonding mode in the polymers is an amine bond and/or an ether bond.

Further, as an example in which an N-substituted melamine is employed as a curing accelerator for an epoxy compound/phenol resin curing system, Japanese Patent Application Laid-open No. Sho 60-202117 discloses an epoxy resin composition in which a novolak type phenol resin and a small quantity of an N-substituted melamine are contained. In this example, an addition reaction of epoxy group with a phenolic OH group is a primary reaction, and a bonding mode in the polymers is an ether bond.

On the other hand, in a curing reaction in an epoxy/acid anhydride composition, an addition reaction of epoxy group with acid anhydride group is a primary reaction, and a bonding mode in the polymers is an ester bond. The curing systems for epoxides are selected in consideration of uses or requirements in properties.

In the case that the epoxy/acid anhydride composition is cured, if a curing accelerator is not mixed as a catalyst, a reactivity of an epoxide with an acid anhydride is poor, productivity for a cured resin exceedingly lowers, and it becomes substantially difficult to prepare the cured resin. As such the curing accelerator, tertiary amines, quaternary ammoniums, tertiary phosphines, quaternary phosphoniums, imidazoles, and azabicyclo-compounds, etc. are exemplified. However, if the curing accelerators are employed together as a catalyst, a reaction usually progresses even at relatively low temperatures, and viscosity increases with a lapse of time in storage, resulting in that a composition becomes incapable of using by gelation. The curing accelerators include many kinds, and although a resin can be more quickly cured by an accelerator having a higher reactivity, stability after mixing becomes exceedingly lower and, contrarily, although an accelerator having a lower reactivity shows more excellent stability, a curing reaction in a resin becomes slower, resulting in that productivity of a cured article becomes lower.

As a fact which cannot be quite supposed in an investigation up to now, it was found that in the epoxy/acid anhydride composition of the present invention in which a specified substituted triazine is contained as a curing accelerator, although the reason is not always clear, stability after such a triazine is contained is exceedingly excellent and a curing reaction is sufficiently quick, resulting in that productivity of a cured article is excellent, and, as a result of an intensive investigation, the present invention has been completed.

The substituted triazine to be employed in the present invention is shown by the formula [I]. However, in the formula [I], in the case of melamine in which X is an amino group, and $R^1$ and $R^2$ are all a hydrogen; acetoguanamine in which X is a methyl group, and $R^1$ and $R^2$ are all a hydrogen; benzoguanamine in which X is a phenyl group, and $R^1$ and $R^2$ are all a hydrogen; N,N-dialkylmelaimine in which X is an N,N-dialkylamino group, and $R^1$ and $R^2$ are all a hydrogen; 2,4-diamino-6-piperidino-1,3,5-triazine in which X is a piperidino group, and $R^1$ and $R^2$ are all a hydrogen; and 2,4-diamino-6-morpholino-1,3,5-triazine in which X is a morpholino group, and $R^1$ and $R^2$ are all a hydrogen, etc., and in the case that the triazine contains 2 to 3 primary amino groups and no secondary amino groups, activity is short and inferiority of curing is caused. Moreover, in the case of curing at a high temperature, a reaction is rapidly caused, resulting in that bubbles and cracks are occasionally caused because of an unhomogenized reaction and rapid evaporation of volatile components. Further, also in the case of a tetra-alkylated acetoguanamine, a tetra-alkylated benzoguanamine, and a hexa-alkylated melamine which have at least two tertiary amino groups and no secondary amino groups, the same results are caused. Still further, in the case that X is a mono alkylamino group, and $R^1$ and $R^2$ are all a hydrogen, that is, also in a mono-alkylated melamine and a penta-alkylated melamine which have one secondary amino group, the same results are caused.

From the above results, it can be readily understood that a secondary amino group such as a monoalkylamino group and a mono (hydroxyalkyl)amino group becomes a center position at which an activity is generated as a curing accelerator for the substituted triazine to be employed in the present invention. The reason is not always clear. For example, it is supposed that in the case of a hexa-alkylated melamine and a tetra-alkylated benzoguanamine, etc., although those are regarded as a kind of tertiary amines, steric hindrance is stronger in circumference of nitrogen atoms compared to general tertiary amines because of the structure of the tertiary amine connected directly with a triazine ring. Further, it is supposed that although a triazine having at least two primary amino groups has an inherent characteristic of a triazine, it does not have a characteristic as an amine, and a reactivity to an epoxide and an acid anhydride is too weak.

Still further, it is supposed that although a triazine having at least two secondary amino groups has an inherent characteristic as a triazine, not only it has a characteristic as an amine, but also steric hindrance is weaker compared to a hexa-alkylated melamine and a tetra-alkylated benzoguanamine, etc., resulting in that those show an excellent characteristic.

It is to be noted that GB Patent No. 1192790 discloses an epoxy resin composition in which an N-substituted melamine having at least two primary amino groups or guanamine, etc. is mixed as an amine-curing agent together with a benzoyl urea- and sulfonyl urea-curing accelerator. In the composition, it is exemplified that the N-substituted melamine having at least two primary amino groups or guanamine, etc. shows an excellent property. However, in Examples for the acid anhydride-curing system, it is only disclosed a combination with the benzoyl urea- and sulfonyl urea-curing accelerator, in which any disclosures with respect to the present invention is not made.

In a mixing ratio in the respective components, a ratio between the above-mentioned epoxy compounds and the acid anhydrides is 0.7 to 1.2 equivalent, preferably 0.8 to 1.1 equivalent, and more preferably 0.9 to 1.0 equivalent of an acid anhydride group based on 1 equivalent of an epoxy group. In the case of less than 0.7 equivalent, there is a problem that a cured article becomes apt to be colorated, and crosslinking density lowers. Although the reason is not always clear, it is supposed that there becomes apt to be caused a side reaction such as a polymerization reaction between epoxy groups. Contrarily, in the case of exceeding 1.2 equivalent, unreacted acid anhydride groups and carboxylic groups derived therefrom increase in a cured article, resulting in that a water absorption property becomes larger in a cured article, and there becomes lower chemical resistance against alkalis, etc., and if it is applied for electronic materials, it causes a decline of insulation resistance, etc.

The substituted triazine shown in the formula [I] is preferably contained in a quantity of 0.1 to 5 parts by weight, and more preferably 0.2 to 3 parts by weight based on 100 parts by weight of the epoxy compounds. In the case of less than 0.1 part by weight, reactivity cannot be sufficiently obtained in curing and, contrarily, in the case of exceeding 5 parts by weight, storage stability becomes lower after the triazine is contained.

In the case that the above-mentioned curing reaction is carried out in a solution, solvents are not particularly limited so far as not obstructing the curing reaction. In the case of a polymerization by casting into a mold, it is preferable to use a solvent capable of readily removal before casting, and in the case of a varnish for aiming at coating, it is preferable to use a solvent capable of readily drying or evaporating at reduced pressure. As the solvents being apt to readily obstruct the curing reaction, a carboxylic acid-solvent and a solvent having phenolic hydroxyl groups are exemplified. Even in the case that the solvents are unavoidably employed, those are preferably employed in a quantity of not more than 1 part by weight based on 100 parts by weight of the epoxy compounds. Further, a primary or secondary amine-solvent should not be mixed at all because of remarkably accelerating a change with a lapse of time by an exceedingly large reactivity with an epoxide and an acid anhydride, and an exceedingly large catalytic activities.

Hereinafter, there are illustrated preferred embodiments in the present invention.

1. An epoxy/acid anhydride composition containing 0.1 to 5 parts by weight of a substituted triazine of formula [I] based on 100 parts by weight of an epoxy compound, and 0.7 to 1.2 equivalent of acid anhydride group based on 1 equivalent of epoxy group in the epoxy compound.

2. An epoxy/acid anhydride composition in which an epoxy compound has at least two epoxy groups.

The present invention also relates to an epoxy/acid anhydride resin composition prepared by thermosetting the epoxy/acid anhydride composition of the present invention.

BEST MODE FOR CARRYING OUT THE INVENTION

Hereinafter, the present invention is specifically illustrated in more detail by Examples and Comparative Examples. There are shown below Epoxy compounds (A1) to (A5), Acid anhydrides (B1) to (B4), Substituted triazines (C1) to (C10), Commercially available triazines (D1) to (D5), Commercially supplied curing accelerators (E1) to (E3), and Solvents (F1) to (F2) which were employed in respective Examples and Comparative Examples.

Epoxy compounds (A1) to (A5)

(A1): Bisphenol A type epoxy resin having a molecular weight of approximately 380 (Epikote 828 having an epoxy group content of 5.3 equivalent/kg, which is a trade name by Yuka-Shell Epoxy, K.K.) was employed as it is.

(A2): Tris(hydroxyphenyl)methane triglycidylether (Tactics 742 having an epoxy group content of 6.3 equivalent/kg, which is a trade name by The Dow Chemical Company) was employed as it is.

(A3): Phenol novolak type epoxy resin (Epikote 152 having an epoxy group content of 5.7 equivalent/kg, which is a trade name by Yuka-Shell Epoxy, K. K.) was employed as it is.

(A4): Triglycidyl isocyanurate (TEPIC-L which is a trade name by Nissan Chemical Industries, Ltd., which is a refined product isolated from isomers having low boiling points of triglycidyl isocyanurate, and which has an epoxy group content of 10.0 equivalent/kg) was employed as it is.

(A5): Bisphenol A type epoxy resin having a molecular weight of approximately 900 (Epikote 1001 having an epoxy group content of 2.0 equivalent/kg, which is a trade name by Yuka-Shell Epoxy, K. K.) was employed as it is.

Acid anhydrides (B1) to (B4)

(B1): Methylhexahydrophthalic anhydride A commercially available reagent was employed as it is.

(B2): Hexahydrophthalic anhydride A commercially available reagent was employed as it is.

(B3): Methylnadic anhydride A commercially available reagent was employed as it is.

(B4): Pyromellitic anhydride A commercially available reagent was employed as it is.

Substituted triazines (C1) to (C10)

(C1): 2-amino-4,6-bis(monobutylamino)-1,3,5-triazine

Into a four-necked flask equipped with a stirrer, a thermometer and a condenser, 18.5 g (0.1 mol) of cyanuric chloride and 150 ml of acetonitrile were dissolved at room temperatures, followed by adding dropwise a mixed solution containing of 7.3 g (0.1 mol) of n-butyl amine and 20 g of an ion-exchanged water over 2 hours while maintaining at a reaction temperature of not more than 5° C. After that, a solution containing of 10 g (0.1 mol) of potassium hydrogen carbonate and 40 g of an ion-exchanged water was added dropwise over 1 hour while maintaining the temperature at not more than 5° C., followed by adding dropwise 15.2 g (0.25 mol) of 28% aqueous ammonia at the same temperature and stirring at 50° C. for 4 hours after gradually heating. After that, a product was filtered and washed with a large quantity of an ion-exchanged water, followed by drying in vacuo to obtain 2-amino-4-butylamino-6-chloro-1,3,5-triazine which is an intermediate raw material. Total quantity of the raw material was dispersed into 100 g of an ion-exchanged water, followed by adding 8.1 g (0.11 mol) of n-butyl amine and raising the temperature to a reflux temperature while stirring and reacting for 2 hours. Further, a solution containing 4.0 g (0.1 mol) by weight of sodium hydroxide and 20 g of an ion-exchanged water was dropwise added over 1 hour, followed by allowing to react at the reflux temperature for 2 hours. After cooling to room temperatures, a product was extracted with 100 ml of toluene, and an organic layer was washed five times with 80 ml of an ion-exchanged water, followed by distilling off solvents at reduced pressure to obtain 27 g of 2-amino-4,6-bis(monobutylamino)-1,3,5-triazine.

(C2): 2-amino-4,6-bis(monocyclohexylamino)-1,3,5-triazine

In a four-necked flask equipped with a stirrer, a thermometer and a condenser, dissolved 18.4 g (0.1 mol) of cyanuric chloride and 50 ml of acetonitrile were dissolved at room temperatures while stirring, followed by cooling a system and adding dropwise a mixture containing 35 g of an ion-exchanged water, 9.9 g (0.1 mol) of cyclohexyl amine, and 10.1 g (0.1 mol) of triethyl amine over 2 hours while maintaining at a reaction temperature of not more than 5° C. After further stirring at 5° C. for 2 hours, 70 ml of 28% aqueous ammonia of was added dropwise, followed by stirring at 5° C. for 1 hour, at 20° C. for 1 hour, and at 50° C. for 2 hours. After that, temperature was elevated to 60° C., and 54.5 g (0.55 mol) of cyclohexyl amine was added and, further, the temperature was elevated to 70° C., followed by stirring for 3 hours. 180 g of an ion-exchanged water was added dropwise, followed by cooling to 10° C. while stirring. A crystal deposited was filtered and washed with a large quantity of an ion-exchanged water, followed by drying in vacuo to obtain 16.5 g of 2-amino-4,6-bis(monocyclohexyl-amino)-1,3,5-triazine which is in powder-state.

(C3): 2,4,6-tris(monobutylamino)-1,3,5-triazine

An autoclave equipped with a stirrer and a thermometer was charged with 12.6 g (0.1 mol) of melamine, 200 g of 1,4-dioxane, 72.0 g (1.0 mol) of n-butyl aldehyde and 2.0 g of 5% Pd-carried active carbon. After the inside of the system was purged with a nitrogen gas, the reaction was conducted at a reaction temperature of 180° C. and under a hydrogen gas (initial pressure of 40 kg/cm$^2$) for 6 hours. After the completion of the reaction, the autoclave was gradually cooled to room temperature, followed by filtering to remove a catalyst and a solid and distilling off a solvent to obtain a crude reaction product which is in a viscous liquid. The crude reaction product was dissolved into a mixed solvent of acetone and hexane which is an eluent, followed by developing through a silica gel column chromatography while successively changing the concentration in a mixing proportion of 100/1 to 1/100. After isolating a product, the mixed solvent was distilled off to obtain 19.6 g of 2,4,6-tris-(monobutylamino)-1,3,5-triazine which is in a liquid-state.

(C4): 2,4,6-tris(mono-2-ethylhexylamino)-1,3,5-triazine

The same procedures were repeated as in the N-substituted melamine (C3), except that 2-ethylhexyl aldehyde was employed place of n-butyl aldehyde to obtain 25.5 g of 2,4,6-tris(mono-2-ethylhexylamino)-1,3,5-triazine which is in a liquid-state.

(C5): 2,4-bis(monobutylamino)-6-(monododecylamino)-1,3,5-triazine

The same procedures were repeated as in the N-substituted melamine (C1), except that n-dodecyl amine was employed in place of the aqueous ammonia to obtain 2,4-bis(monobutyl-amino)-6-(monododecylamino)-1,3,5-triazine which is in a solid-state.

(C6): 2,4-bis(monobutylamino)-6-piperidino-1,3,5-triazine

The same procedures were repeated as in the N-substituted melamine (C1), except that piperidine was employed in place of the aqueous ammonia to obtain 2,4-bis(monobutylamino)-6-piperidino-1,3,5-triazine which is in powder-state.

(C7): 2,4-bis(mono-2-ethylhexylamino)-6-monobutylamino-1,3,5-triazine

The same procedures were repeated as in the N-substituted melamine (C1), except that mono-2-ethylhexylamine was employed in place of n-butyl amine, and further n-butyl amine was employed in place of the aqueous ammonia to obtain 2,4-bis(mono-2-ethylhexylamino)-6-monobutylamino-1,3,5-triazine.

(C8): 2-amino-4,6-bis(2-hydroxyethylamino)-1,3,5-triazine

The same procedures were repeated as in substituted triazine (C1), except that monoethanolamine was employed in place of n-butyl amine to obtain 2,4-bis(amino)-6-(2-hydroxyethylamino)-1,3,5-triazine which is in a powder-state.

(C9): 2,4-bisamino-6-monobutylamino-1,3,5-triazine

In a four-necked flask equipped with a stirrer, a thermometer and a condenser, 184.4 g (1.0 mol) of cyanuric chloride and 800 ml of acetonitrile were dissolved at room temperature, and a system was cooled, followed by adding dropwise 303.7 g (5.0 mol) of 28% aqueous ammonia over 2 hours while vigorously stirring and maintaining reaction temperature at not more than 10° C. After that, stirring was continued for 1 hour after heating to room temperature, followed by gradually heating to 50° C. and further aging for 4 hours. After cooling to room temperature, a product was filtered and washed with a large quantity of an ion-exchanged water, followed by drying in vacuo to obtain 115 g (yield of 79%) of 2,4-bis(amino)-6-chloro-1,3,5-triazine.

Subsequently, into a four-necked flask equipped with a stirrer, a thermometer and a condenser, 14.5 g (0.1 mol) of 2,4-bis(amino)-6-chloro-1,3,5-triazine obtained, 100 g of an ion-exchanged water and 29.2 g (0.4 mol) of n-butyl amine were added, followed by allowing to react for 6 hours after heating to a reflux temperature while stirring. After cooling the resulting product to room temperature, the product was filtered and washed with a large quantity of an ion-exchanged water, and then washed with toluene, followed by drying in vacuo to obtain 17.5 g of 2,4-bis(amino)-6-monobutylamino-1,3,5-triazine which is in a powder-state.

(C10): 2,4-bis(amino)-6-dibutylamino-1,3,5-triazine

The same procedures were repeated as in the Substituted triazine (C1), except that dibutylamine was employed in place of n-butyl amine to obtain 2,4-bis(amino)-6-dibutylamino-1,3,5-triazine which is in a powder-state.

Commercially available triazines (D1) to (D5)

(D1): Melamine

Melamine (manufactured by Nissan Chemical Industries, Ltd., powder-state) was employed as it is.

(D2): Benzoguamine

A commercially available reagent was employed as it is.

(D3): Acetoguanamine

A commercially available reagent was employed as it is.

(D4): 2,4-bis(amino)-6-vinyl-1,3,5-triazine

A commercially available reagent was employed as it is.

(D5): N,N-diallyl melamine

A commercially available reagent was employed as it is.

Commercially available curing accelerators (E1) to (E3)

(E1): 2,4,6-tris(dimethylaminomethyl)-phenol

A commercially available reagent was employed as it is.

(E2): 2-ethyl-4-methylimidazole

A commercially available reagent was employed as it is.

(E3): 2-methylimidazole

A commercially available reagent was employed as it is.

Solvents (F1)–(F2)

(F1): methylethylketone

A commercially available special grade reagent was employed as it is.

(F2): methylisobutylketone

A commercially available special grade reagent was employed as it is.

EXAMPLES 1 to 8 AND COMPARATIVE EXAMPLES 1 to 10

The above-mentioned Epoxy compounds (A1) to (A5), Acid anhydrides (B1) to (B4), Substituted triazines (C1) to (C10), Commercially available triazines (D1) to (D5), Commercially available curing accelerators (E1) to (E3), and Solvents (F1) to (F2) were mixed in a weight ratio as shown in Table 1 and Table 2, followed by conducting an evaluation of a curing activity, outer appearances in cured resins, and storage stability test. Table 1 shows results of Examples for the present invention, and Table 2 shows results of Comparative Examples.

It is to be noted that E/An shown in the Tables shows equivalent ratio of epoxy group with respect to acid anhydride group.

TABLE 1

| Component | | Examples | | | | | | | |
|---|---|---|---|---|---|---|---|---|---|
| | | 1 | 2 | 3 | 4 | 5 | 6 | 7 | 8 |
| Epoxide | A1 | 100 | 100 | 100 | — | — | — | 50 | — |
| | A2 | — | — | — | 100 | — | — | — | 50 |
| | A3 | — | — | — | — | 100 | — | — | — |
| | A4 | — | — | — | — | — | 70 | 50 | — |
| | A5 | — | — | — | — | — | 30 | — | 50 |
| Acid anhydride | B1 | 89 | 89 | 89 | — | — | — | — | — |
| | B2 | — | — | — | 101 | 82 | — | — | 67 |
| | B3 | — | — | — | — | — | 94 | 94 | — |
| | B4 | — | — | — | — | 6 | — | — | 4 |
| E/An ratio | | 1/1 | 1/1 | 1/1 | 1/0.9 | 1/0.9 | 1/0.8 | 1/0.8 | 1/1 |
| Accelerator | C1 | 1 | — | — | — | — | — | — | — |
| | C2 | — | 1 | — | — | — | — | — | — |
| | C3 | — | — | 0.5 | — | — | — | — | — |
| | C4 | — | — | — | 2 | — | — | — | — |
| | C5 | — | — | — | — | 1.5 | — | — | — |
| | C6 | — | — | — | — | — | 1.5 | — | — |
| | C7 | — | — | — | — | — | — | 1.5 | — |
| | C8 | — | — | — | — | — | — | — | 1 |

TABLE 1-continued

| Com-ponent | | Examples | | | | | | | |
|---|---|---|---|---|---|---|---|---|---|
| | | 1 | 2 | 3 | 4 | 5 | 6 | 7 | 8 |
| Solvent | F1 | — | — | — | — | — | 100 | 100 | — |
| | F2 | — | — | — | — | — | — | — | 100 |

TABLE 2

| Component | Comparative Examples | | | | | | | | | |
|---|---|---|---|---|---|---|---|---|---|---|
| | 1 | 2 | 3 | 4 | 5 | 6 | 7 | 8 | 9 | 10 |
| A1 | 100 | 100 | 100 | 100 | 100 | 100 | 100 | 100 | 100 | 100 |
| B1 | 89 | 89 | 89 | 89 | 89 | 89 | 89 | 89 | 89 | 89 |
| E/An | 1/1 | 1/1 | 1/1 | 1/1 | 1/1 | 1/1 | 1/1 | 1/1 | 1/1 | 1/1 |
| C9 | 1 | — | — | — | — | — | — | — | — | — |
| C10 | — | 1 | — | — | — | — | — | — | — | — |
| D1 | — | — | 1 | — | — | — | — | — | — | — |
| D2 | — | — | — | 1 | — | — | — | — | — | — |
| D3 | — | — | — | — | 1 | — | — | — | — | — |
| D4 | — | — | — | — | — | 1 | — | — | — | — |
| D5 | — | — | — | — | — | — | 1 | — | — | — |
| E1 | — | — | — | — | — | — | — | 1 | — | — |
| E2 | — | — | — | — | — | — | — | — | 1 | — |
| E3 | — | — | — | — | — | — | — | — | — | 1 |

(Evaluation)

According to the methods (T1) to (T3) described below, there were evaluated a storage stability, curing activity, and a polymer (a cured article) in an epoxy/acid anhydride composition.

The test results are shown in Table 3.

Curing activity test (T1)

A hot plate equipped with a thermostat was heated and maintained at 200° C., and 0.2 g of respective compositions shown in Tables 1 and 2 were dripped on the hot plate. Then, it was stirred with a bamboo rod having the diameter of 3 mm, followed by measuring a period of time (hereinafter, referred to as Gelling Time) until which string of the solution of the composition is broken to investigate the curing activity. The Gelling Time at 200° C. is shown such as "" in not more than 120 seconds, "Δ" in 121 to 300 seconds, "x" in 300 to 1800 seconds, and "x x" in more than 1800 seconds, respectively.

Storage stability test (T2)

Respective compositions shown in Tables 1 and 2 were stored at 23° C., and a viscosity change with stored days was measured at 25° C. with an EH-type viscometer. Days through which the viscosity immediately after mixing attains to a double value are shown such as "" in not less than 10 days, "Δ" in 5 to 9 days, "x" in 2 to 4 days, and "x x" in less than 24 hours, respectively.

Polymerization by casting into a mold (T3)

A silicone rubber-made spacer having a cut-shaped "⊐" of 3 mm in thickness and 10 mm in width was placed between two pieces of glass plates which have the length of 140 mm×the width of 240 mm×the thickness of 3 mm and were coated with a releasing agent, and fixed by a fixing clip so as to prepare a mold for casting a cell having an internal capacity of the length of 130 mm×the width of 220 mm×the depth of 1 mm. Into the cell, respective compositions shown in Tables 1 and 2 were cast, followed by curing at 100° C. in an oven for 2 hours, and further curing at 180° C. for 3 hours. After cooling to room temperatures, the cell for a polymerization by casting into a mold was removed, followed by observing an outer appearance in cured articles from the epoxy resin compositions.

Since compositions in the Examples 6, 7, and 8 of Table 1 contain a volatile organic solvent, the solvent was in advance removed with an evaporator, followed by casting into the cell.

The number of cracks is shown such as "○" in the quite absence, "Δ" in the presence of 1 to 3 pieces, and "x" in the presence of not less than 4 pieces. Likewise, the number of bubbles is shown such as "○" in the quite absence, "Δ" in the presence of 1 to 5 pieces, and "x" in the presence of not less than 6 pieces or the presence of a large mark by boiling of volatile components.

TABLE 3

| | T1 | T2 | T3 | |
|---|---|---|---|---|
| | | | crack | bubble |
| Example | | | | |
| 1 | ○ | ○ | ○ | ○ |
| 2 | ○ | ○ | ○ | ○ |
| 3 | ○ | ○ | ○ | ○ |
| 4 | ○ | ○ | ○ | ○ |
| 5 | ○ | ○ | ○ | ○ |
| 6 | ○ | ○ | ○ | ○ |
| 7 | ○ | ○ | ○ | ○ |
| 8 | ○ | ○ | ○ | ○ |
| Comparative Example | | | | |
| 1 | x | x | 0 | ○ |
| 2 | xx | x | Δ | Δ |
| 3 | xx | ○ | x | x |
| 4 | xx | x | x | x |
| 5 | xx | x | x | x |
| 6 | xx | x | x | x |
| 7 | xx | Δ | x | x |
| 8 | ○ | xx | ○ | ○ |
| 9 | ○ | xx | ○ | ○ |
| 10 | ○ | xx | ○ | ○ |

The results in the Table 3 show that all the epoxy/acid anhydride compositions in the Examples 1 to 8 are more excellent in all the curing activity, storage stability, and properties in cured articles in comparison with insufficient properties of the epoxy/acid anhydride compositions in the Comparative Examples 1 to 10.

Possibility of utilization in Industry

The epoxy/acid anhydride composition of the present invention is characterized in that it can be prepared to a composition having a relatively low viscosity of 2 to 1000 cps by optionally diluting with organic solvents, and also, it can be prepared to a composition having a relatively high viscosity of 1000 to 100000 cps by a change to a B stage or by oligomerization thereof through in advance heating without employing solvents after mixing the claimed epoxy/acid anhydride composition with a substituted triazine. The storage stability after mixing is also exceedingly high as an epoxy/acid anhydride composition, for example, such as not less than 7 days at room temperatures, and also, it is excellent in a stability after mixing with a variety of liquid-state materials. Further, the epoxy/acid anhydride composition of the present invention can be conveniently cured. Curing is carried out at 100 to 200° C. for 1 to 5 hours or so using a usual electric furnace, a hot air-circulating furnace, an infrared rays furnace, a microwave furnace, and an induction heating furnace, etc. Also in the case that it is employed by diluting with organic solvents, it can be cured in the above-mentioned conditions or so while evaporating the solvents. Still further, it can be also mixed or impregnated with inorganic fillers such as silica particles, alumina particles, and glass fibers, or reinforcing materials. Also, it is excellent in an adhesive property with wooden materials, metallic materials, and a variety of inorganic compounds, etc., and it is high in chemical resistance, whereby, it can be also utilized in uses such as vehicles for coatings, coatings and adhesives for ceramics, coatings and adhesion for concrete, sealing materials for construction and building materials, adhesives for papers and woods, glass cloth/epoxy composite materials, carbon fiber-reinforced composite materials, boron fiber-reinforced composite materials, fiber-processing agents, binders for medicines and agricultural chemicals, coating materials for the surface of plastics, coating materials for preventing fracture of glass, masking materials for film-forming, and resin-based encapsulants for electronic parts, etc.

What is claimed is:

1. An epoxy/acid anhydride composition characterized by containing, as a curing accelerator, a substituted triazine of the formula [I]

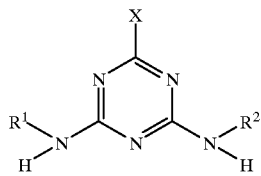

[I]

(wherein X is an amino group, $C_{1-18}$ monoalkylamino group, di $C_{1-18}$ alkylamino group, morpholino group, piperidino group, methyl group or phenyl group; $R^1$ and $R^2$ independently each represent $C_{1-12}$ alkyl group, $C_{1-12}$ hydroxyalkyl group, $C_{4-8}$ cycloalkyl group, $C_{5-9}$ cycloalkylmethyl group or $C_{5-9}$ methylcycloalkyl group) in an epoxy/acid anhydride composition in which an epoxy compound and an acid anhydride-curing agent are contained.

2. An epoxy/acid anhydride composition as claimed in claim 1, characterized by containing 0.1 to 5 parts by weight of a substituted triazine of formula [I] based on 100 parts by weight of an epoxy compound, and 0.7 to 1.2 equivalent of acid anhydride group based on 1 equivalent of epoxy group in the epoxy compound.

3. An epoxy/acid anhydride composition as claimed in claim 1, wherein the epoxy compound is one which has at least two epoxy groups.

4. An epoxy/acid anhydride resin composition prepared by curing the epoxy/acid anhydride composition as claimed in claim 1.

5. An epoxy/acid anhydride composition prepared by mixing an epoxy compound and an acid anhydride-curing agent, the epoxy/acid anhydride composition comprising, as a curing accelerator, 0.1 to 5 parts by weight of a substituted triazine of the formula [I]

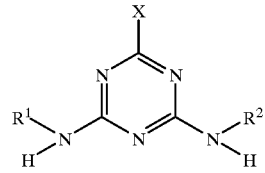

[I]

(wherein X is an amino group, $C_{,1-18}$ monoalkylamino group, di $C_{1-18}$ alkylamino group, morpholino group, piperidino group, methyl group or phenyl group; $R^1$ and $R^2$ independently each represent $C_{1-12}$ alkyl group, $C_{,1-2}$ hydroxyalkyl group, $C_{4-8}$ cycloalkyl group, $C_{5-9}$ cycloalkylmethyl group or $C_{5-9}$ methylcycloalkyl group) based on 100 parts by weight of epoxy compound, and containing 0.7 to 1.2 equivalent of acid anhydride group of the acid anhydride based on 1 equivalent of epoxy group in the epoxy compound.

6. An epoxy/acid anhydride resin composition as claimed in claim 3 wherein the epoxy compound is one which has at least two epoxy groups.

\* \* \* \* \*